United States Patent [19]

Nakai et al.

[11] Patent Number: 5,052,522
[45] Date of Patent: Oct. 1, 1991

[54] ENCODER INSTALLING STRUCTURE

[75] Inventors: Keiichiro Nakai, Tokyo; Manabu Suganuma, Narita, both of Japan

[73] Assignee: Otis Elevator Company, Farmington, Conn.

[21] Appl. No.: 442,884

[22] Filed: Nov. 29, 1989

[30] Foreign Application Priority Data

Dec. 9, 1988 [JP]  Japan ................................ 63-311542

[51] Int. Cl.$^5$ ............................................. B66B 11/04
[52] U.S. Cl. ....................................... 187/20; 187/139; 73/493
[58] Field of Search ...................... 187/20, 38, 39, 1 R, 187/95, 130, 135, 116, 100, 139; 73/529, 493, 526; 324/160, 173

[56]  References Cited

U.S. PATENT DOCUMENTS

| | | | |
|---|---|---|---|
| 613,187 | 10/1898 | Boyd | 73/529 |
| 2,105,158 | 1/1938 | Pearce et al. | 73/493 |
| 4,207,768 | 6/1980 | Henss | 73/493 |

Primary Examiner—Joseph E. Valenza
Assistant Examiner—Kenneth Noland
Attorney, Agent, or Firm—William W. Jones

[57] ABSTRACT

A rotary encoder engages the circumferential periphery of an elevator sheave to monitor the rotational speed of the sheave. The encoder is mounted on an adjustable mounting assembly which biases the rotor against the sheave circumference along a line passing through the axis of rotation of the sheave.

3 Claims, 2 Drawing Sheets

ENCODER INSTALLING STRUCTURE

TECHNICAL FIELD

The present invention relates to a mounting structure for an encoder, and particularly to a mounting structure for the encoder for a sheave on an elevator.

BACKGROUND ART

In a so-called traction-type elevator system having a sheave driven by a motor to drive ropes wound on the sheave, encoders for detecting the velocity of the elevator car are installed at the output axis of the motor through a timing belt or the like, whereby the velocity of the elevator car is detected based upon the revolutions per minute of the motor output axis.

However, in the elevator system using a linear motor which has been developed as the driving mechanism, a counterweight or the elevator car itself is directly and linearly driven by the linear motor, and the sheave onto which the ropes are guided acts as an idler rotatably driven by the rope. Thus there is no motor corresponding to that of the traction-type elevator.

DISCLOSURE OF THE INVENTION

An encoder installing structure according to a first embodiment of this invention is constructed such that a biasing force is provided by a spring means to an encoder rotor arranged adjacent to a circumference surface of a sheave to always apply a predetermined normal load to the rotor and the sheave in a direction toward the axis line of the sheave at a contact point with the sheave circumference surface.

In an encoder mounting structure according to a second embodiment of the invention, a biasing force is provided by a spring means to a plurality of encoder rotors arranged in contact with a circumferential surface of a sheave to always apply substantially the same normal load to the sheave in a direction toward the rotational axis of the sheave at respective contact points with the rotor and the sheave circumference surface.

The encoder mount of this invention comprises a movable arm member on a first hinge pin on which arm member the encoder is so connected to be movable therewith. A spring means for biasing the installing member in a direction toward an axis line of the sheave is located in a first plane including axis lines of the first hinge pin and the sheave.

The encoder mounting structure according to the invention may include first and second encoders arranged on a circumferential surface of the sheave.

An object of the present invention is, therefore, to provide an installing structure of the encoder capable of determining a necessary data such as the velocity of the moving elevator car based upon the monitored rotational movement of the sheave.

This and other objects and advantages of this invention will become more readily apparent from the following detailed description of preferred embodiments of the invention when taken in conjunction with the accompanying drawings, in which:

BEST MODE FOR CARRYING OUT THE INVENTION

Figure 2:
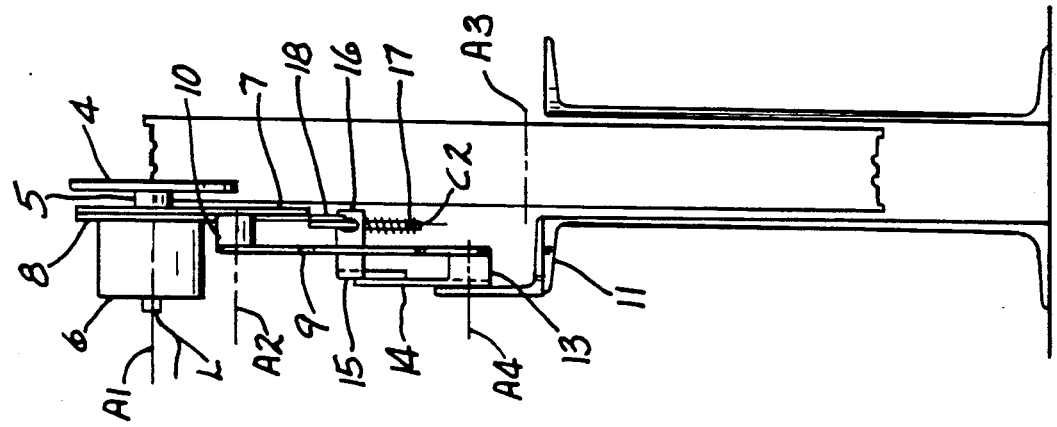
FIG. 2 is a side view of FIG. 1.
Figure 1:
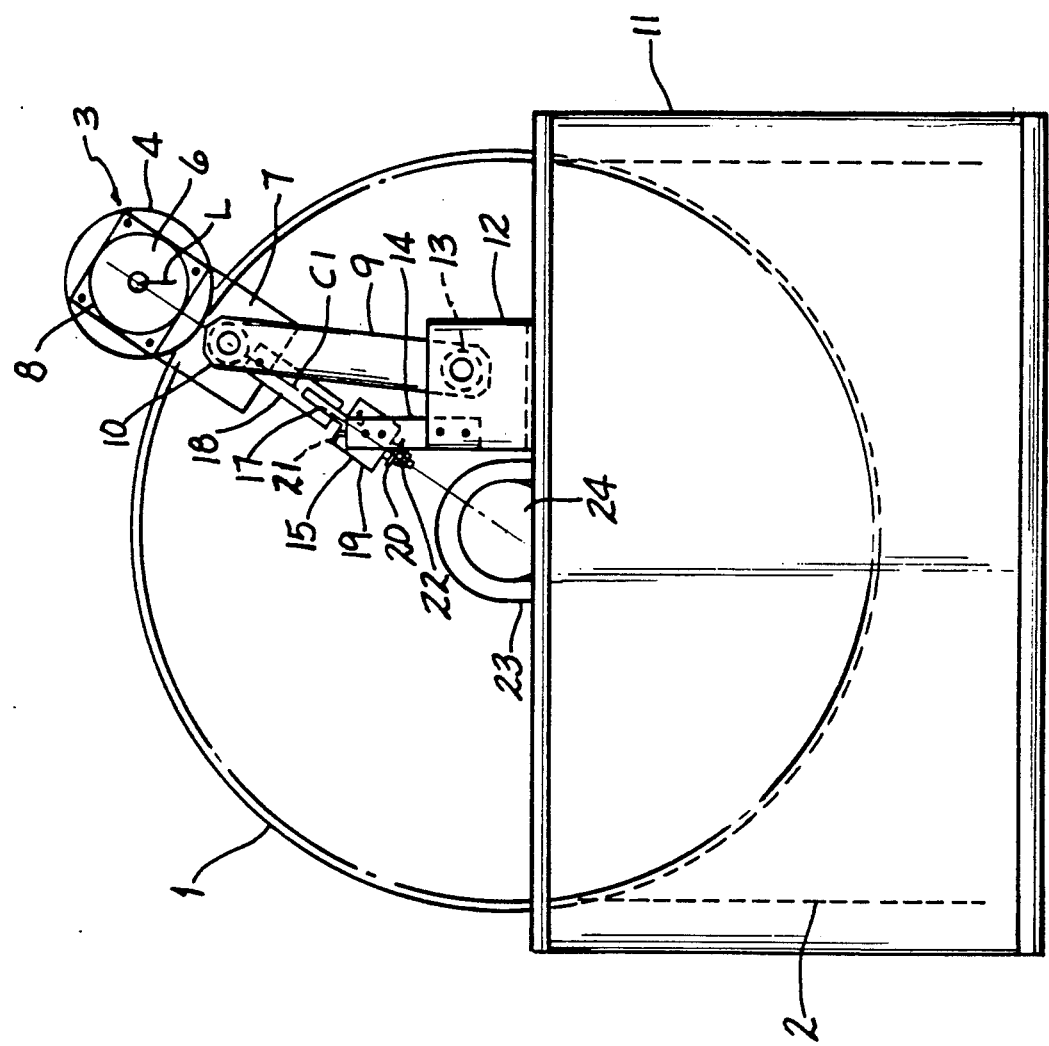
FIG. 1 shows a front view representing an encoder installing structure according to the first preferred embodiment of the present invention.

FIGS. 1 and 2 show a first preferred embodiment of the present invention. In the drawings, the rope 2 is wound up on a sheave used for the traction-type elevator system, the sheave is rotatably driven by a motor (not shown) to wind up the rope 2. On the other hand, in the linear motor driving-type elevator system, the sheave 1 is an idler and is subsidiarily rotated by the displacement operation of the rope 2. On the sheave 1, the rotor 4 of the velocity detecting encoder 3 is arranged at the outside of the rope 2 so as to contact with the circumferential surface of the sheave 1. The rotor 4 is coupled with a signal forming portion 6 so as to be freely movable through a rotating axis 5. The signal forming portion 6 is fixed to a movable bracket 7 by a bolt and a nut through an installing plate 8. The signal forming portion 6 is connected with a well-known system control apparatus (not shown) through a lead line L. In the movable bracket 7, the encoder or the upper end of a pivot arm member 9 for swinging the movable bracket is hinged at the lower portion of the signal forming portion 6. The movable bracket 7 is constructed so as to be freely movable around the hinge pin 10 relative to the arm member 9. Similarly, the lower end of the pivot arm member 9 is hinged to a fixing bracket 12 installed on a flange 11 through a pin 13, and the pivot arm member 9 is constructed so as to be freely movable relative to the fixing bracket 12.

The lower end portion of an auxiliary bracket 14 is also fixed by the bolt and nut to the fixing bracket 12. An oval hole formed in outer surface of an approximately "L"-shaped bracket 15 carries a movable rod 17. The upper end of the rod 17 is fixed to the lower end of a connecting member 18 by welding. The upper end of the connecting member 18 is fixed with the movable bracket 7 through a bolt and nut. At the lower portion of the rod 17 which is inserted through the oval hole, a compressed coil spring 19 is provided between spring seats 20 and 21 between the lower portion of the other surface of the bracket 15 and the lower end of the rod 17. The spring seat 20 of the lower side is fixedly placed by a double nut 22 through washer.

The apparatus is so constructed to place the axis lines A1 and A2 of the rotor 4 and the hinge pin 10, respectively, plus the central lines C1 and C2 of the connecting member 10 and the rod 17 all in the same plane.

A U-shaped member 23 provided at the flange 11 mounts a shaft 24 on the sheave 1 rotatably to the flange 11.

For positioning the rotor 4 of the encoder 3 at the circumference surface of the sheave 1, the pivot arm member 9 and the movable bracket 7 swing to properly locate the axis line A3 of the sheave 1 or the shaft 24 in a plane including axis lines A1–A2 and central lines C1–C2. The installed portion of the rod 17 can move inside of the oval hole 16. Then, the spring 19 is compressed by the nuts 22 and 23 to give a predetermined biasing force urging the rotor 4 against the sheave 1.

As a result, the rotor 4 of the encoder 3 always applies a predetermined normal load to the sheave 1 at the circumference surface of the sheave 1, realizing exact transmission of the extent and velocity of rotational movement of the sheave 1.

It will be noted that the plane including the axis lines A1-A3 and the central lines C1-C2 and the plane including the axis lines A2 and A4 of the hinge pins 10 and 13 are mutually coplanar.

Furthermore, it is noted that although in the above embodiment there has been described the encoder as an encoder for detecting velocity, the present invention may apply to other encoders for detecting other data in the similar manner.

Figure 4:
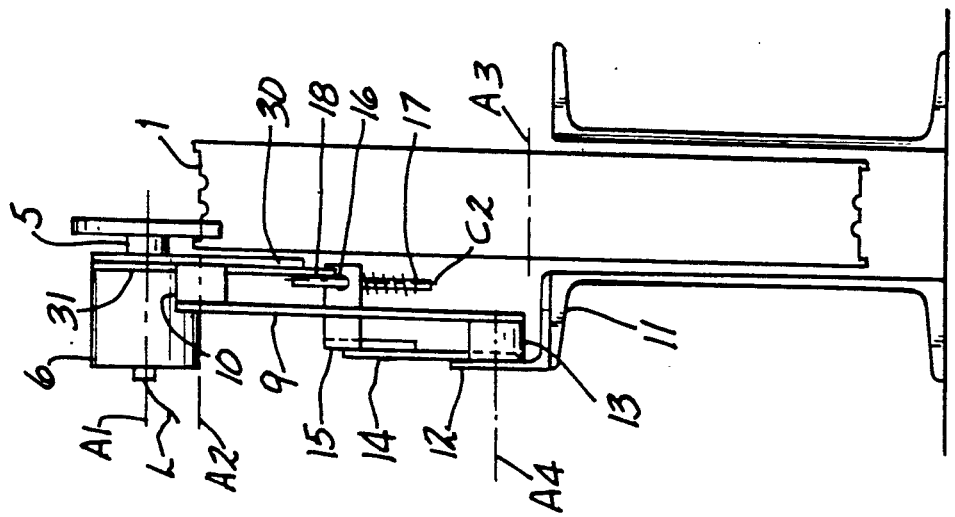
FIG. 4 is a side view where a rotor located at the lower side of the two rotors shown in FIG. 3 is removed.
Figure 3:
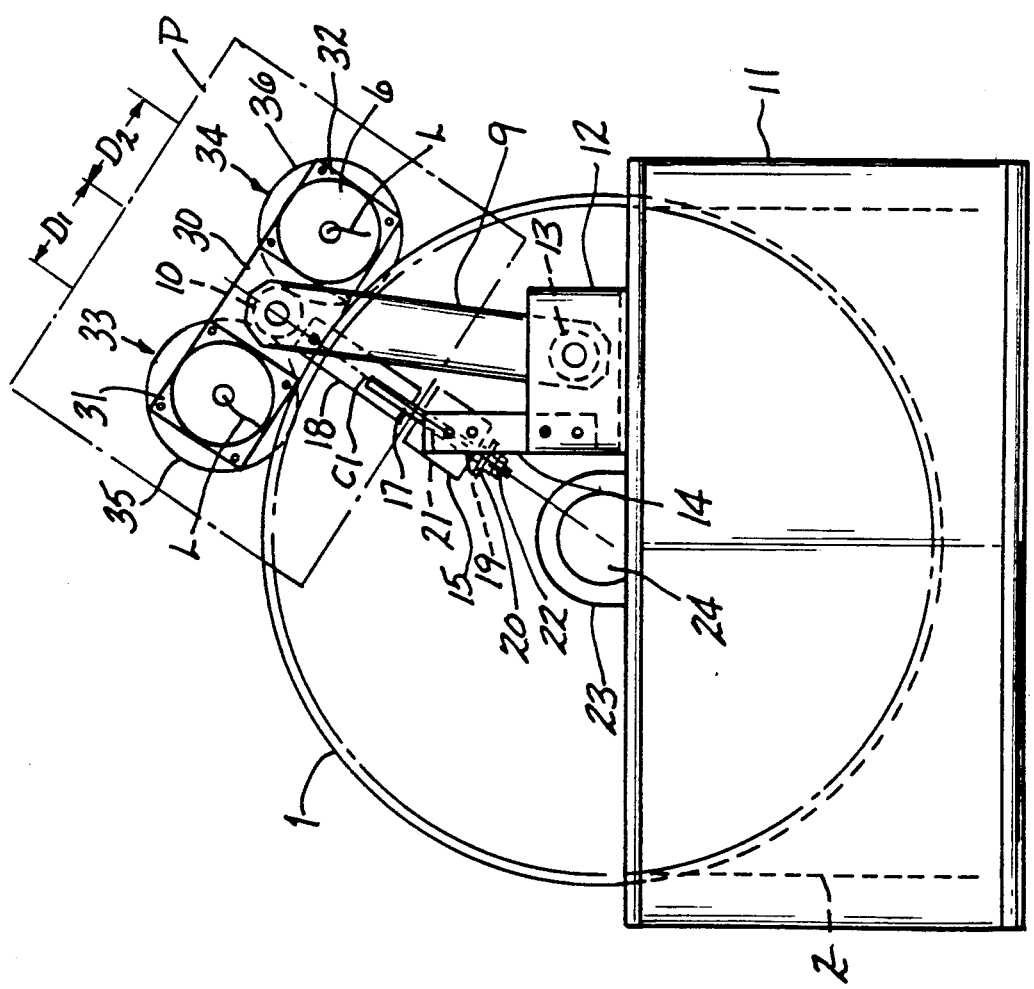
FIG. 3 is a front view representing an encoder installing structure according to the second preferred embodiment.

FIGS. 3 and 4 represent a second preferred embodiment of the invention. In the drawings, the same members as those in the first embodiment are used to identify the same structures and the explanation thereof is omitted here.

In this embodiment, there is shown an encoder installing structure equipped with two encoders. At both ends of a movable bracket 30, encoders 33 and 34 are respectively installed through installing plates 31 and 32 in the same manner as in the first embodiment. The pivot arm member 9 is installed at the movable bracket 30 between rotors 35 and 36 in the similar manner of the first embodiment. Moreover, the connecting member 18 is installed at the movable bracket in the lower side of the hinge pin 10 between the movable bracket 30 and the arm member 9 in the similar manner of the first embodiment.

Here, a first plane including the central lines C1 and C2 of the connecting member 18 and the rod 17 and a second plane including axis lines A1 of the rotors 35 and 36 are orthogonally crossed. The axis line A2 of the hinge pin 10 is located on the first plane. Further, in the plane P which is orthogonally crossed with the axis lines A1 of the rotors 35 and 36 and the axis line A2 of the hinge pin 10, the rotors 35 and 36 are positioned such that the distance D1 between points on the lines A1 and A2 of the rotor 35 and distance D2 between points on the lines A1 and A2 of the rotor 36 are the same.

It is to be noted here that in this embodiment the axis line A2 of the hinge pin 10 is also positioned to locate in the same plane containing the rotor axes A1.

The method of arranging the rotors 35 and 36 of the encoders 33 and 34 on the circumference surface of the sheave is almost the same so that in the first embodiment, a predetermined driving force is given by compressing the spring 19 through the nuts 22 when the axis line A3 is properly aligned with the axes lines A2 and A4.

According to such construction, the rotors 35 and 36 always apply predetermined uniform normal loads in a direction towards the axis line A3 of the sheave 1 at the respective contact portions with the circumference surface of the sheave 1, resulting in exact transmission of the rotational movement of the sheave 1 to the respective rotors 35 and 36.

It will be noted the mounting assembly is constructed such that the axis A3 of the sheave 1 and the axis lines A2 and A4 of the hinge pins 10 and 13 are coplanar.

According to the first embodiment, the rotor of the encoder applies the predetermined normal load to the sheave in the direction toward the axis line of the sheave, realizing the exact transmission of the rotational movement to the rotor.

According to the second embodiment, the plural rotors of the encoder always apply the predetermined uniform normal load of substantially the same value to the sheave in the direction toward the axis of the sheave, resulting in exact transmission of the rotational movement of the sheave to the respective rotors.

Since many changes and variations of the disclosed embodiment of the invention may be made without departing from the inventive concept, it is not intended to limit the invention otherwise than as required by the appended claims.

What is claimed is:

1. An assembly for mounting an encoder of the type having a rotor on an elevator sheave for monitoring rotational movement of the sheave, said assembly comprising:
   a) a bracket for holding the encoder, said bracket being disposed adjacent to the sheave whereby the encoder rotor is disposed opposite the sheave circumferential periphery;
   b) a pivot arm pivotable about a first pivotal axis mounting said bracket, said pivot arm being disposed adjacent to the sheave for pivotal movement with respect thereto, said bracket being pivotable on said pivot arm about a second pivotal axis spaced along said pivot arm from said first pivotal axis;
   c) a connector secured to said bracket and extending therefrom toward the axis of rotation of the sheave; and
   d) spring means operable to bias said connector and said bracket along a radial line passing through the sheave axis, thereby urging the encoder rotor against the circumferential periphery of the sheave when said pivot arm is moved to a position which aligns the rotational axis of the rotor, said second pivotal axis, and the axis of rotation of the sheave along said radial line.

2. The assembly of claim 1 wherein said spring means is mounted on a rod extending from said connector toward the axis of rotation of the sheave.

3. An assembly for mounting a pair of encoders of the type having rotors on an elevator sheave for monitoring rotational movement of the sheave, said assembly comprising:
   a) a bracket for holding the encoders;
   b) a pivot arm mounting said bracket, said pivot arm being pivotally mounted for pivotal movement about a first pivotal axis adjacent to the sheave and said bracket being pivotable on said pivot arm about a second pivotal axis whereby the encoder rotors can be positioned adjacent to the circumferential periphery of the sheave, said second pivotal axis being spaced along the pivot arm from said first pivotal axis and interposed between the respective rotational axes of the rotors; and
   c) means for biasing said bracket along a radial line passing through said second pivotal axis and the axis of rotation of the sheave by reason of pivotal movement of said pivot arm induced by said means for biasing, whereby the encoder rotors are pressed against the circumferential periphery of the sheave.

* * * * *